United States Patent [19]

Wolf

[11] Patent Number: 4,520,888
[45] Date of Patent: Jun. 4, 1985

[54] LOAD SUPPORTING STRUCTURE

[75] Inventor: Marvin L. Wolf, Houston, Tex.

[73] Assignee: FMC Corporation, Chicago, Ill.

[21] Appl. No.: 478,194

[22] Filed: Mar. 24, 1983

[51] Int. Cl.³ .............................................. B60V 1/06
[52] U.S. Cl. ..................................... 180/125; 180/126
[58] Field of Search ................... 180/125, 126, 116; 104/23 FS

[56] References Cited

U.S. PATENT DOCUMENTS

| | | | |
|---|---|---|---|
| 242,668 | 6/1881 | Male | 104/23 FS |
| 2,938,590 | 5/1960 | Barnett | 180/125 |
| 3,124,209 | 3/1964 | Flipse | 180/125 X |
| 3,191,706 | 6/1965 | Petersen | 180/125 |
| 3,239,024 | 3/1966 | Christian | 180/125 |
| 3,253,665 | 5/1966 | Schienle | 180/125 X |
| 3,457,874 | 7/1969 | Tezuka et al. | 180/125 X |
| 3,592,285 | 7/1971 | Noble | 180/124 |
| 3,598,198 | 8/1971 | Williams | 180/121 |
| 3,780,823 | 10/1973 | Michaud | 180/121 |
| 3,822,761 | 7/1974 | Vaughen | 180/121 |
| 3,908,784 | 9/1974 | Blurton et al. | 180/119 |
| 4,273,244 | 3/1981 | Jensen et al. | 212/181 |
| 4,313,512 | 2/1982 | Jutras | 180/126 |

OTHER PUBLICATIONS

Cern Pneumatic Platform, The Engineer, 12/9/60.
Aero-Co., Inc.—Aero-Caster Load Module Systems Publication.

Primary Examiner—John A. Pekar
Attorney, Agent, or Firm—A. J. Moore; H. M. Stanley; R. B. Megley

[57] ABSTRACT

A load supporting structure is disclosed for supporting and maintaining a heavy load stable when being moved on a substantially flat supporting surface by another vehicle. The structure includes a rigid annular foot, and a pressure chamber with one of its walls being a portion of the flat surface. A rigid load supporting platform is connected to the rigid foot and to the pressure chamber for supporting a heavy load. Air is directed into the pressure chamber at sufficient pressure to support substantially all the weight of the supporting structure and the load, but with insufficient pressure to lift the rigid annular foot from the flat surface. The air in the chamber is substantially prevented from flowing under the annular foot but will allow some air to escape in the event crevices or the like in the substantially flat surface provide air flow paths.

8 Claims, 4 Drawing Figures

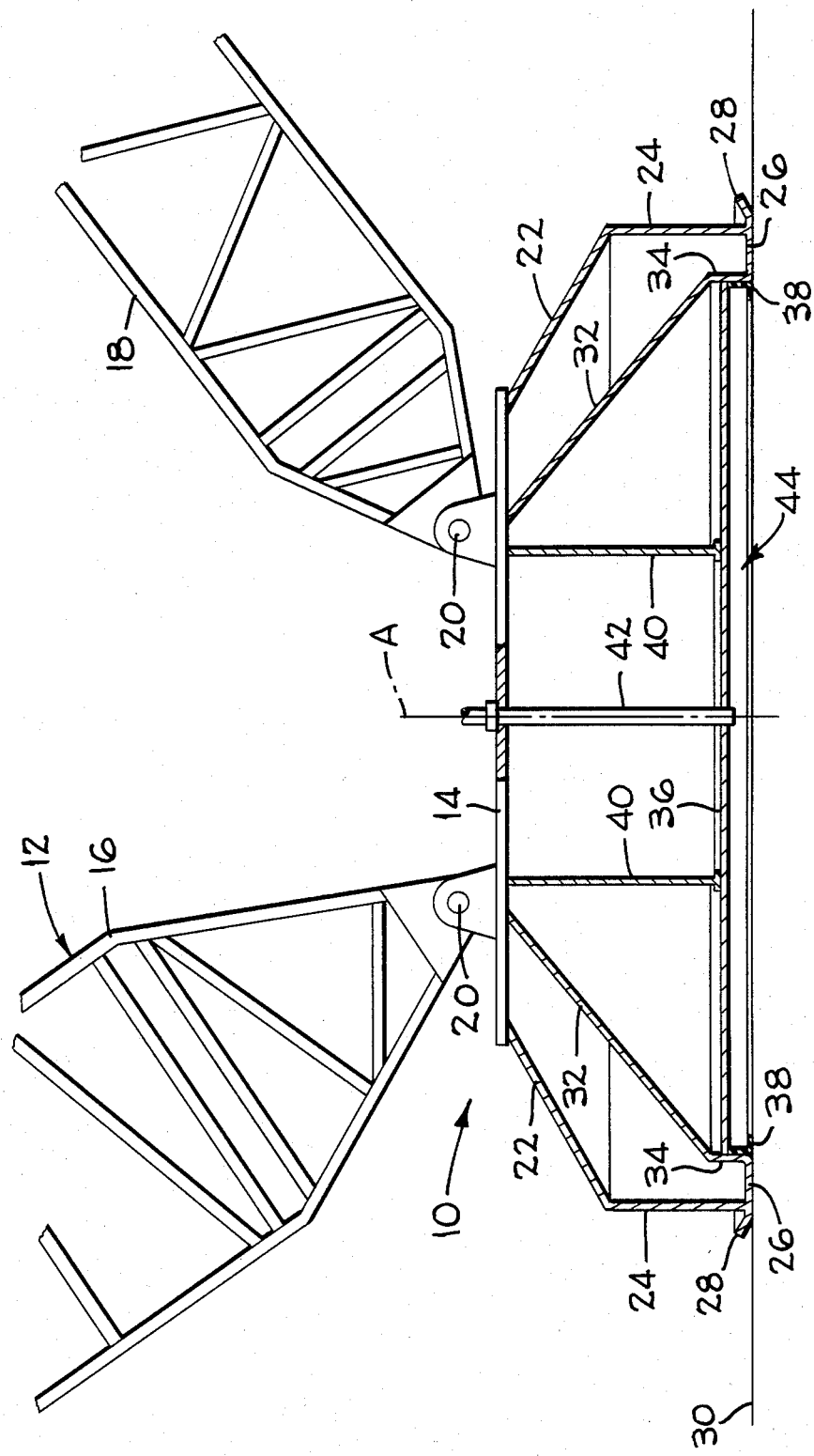
FIG_1

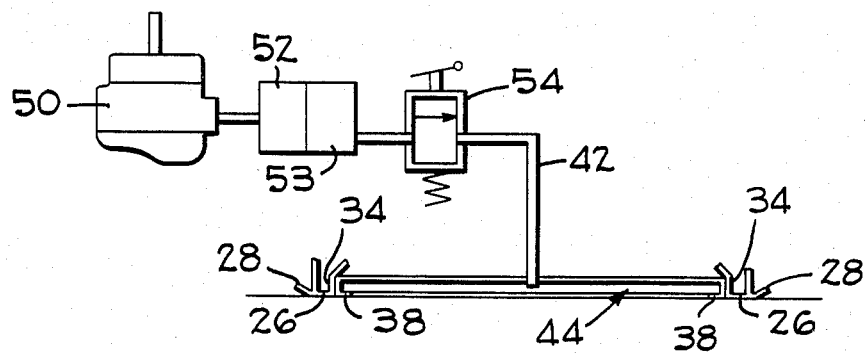
FIG_2
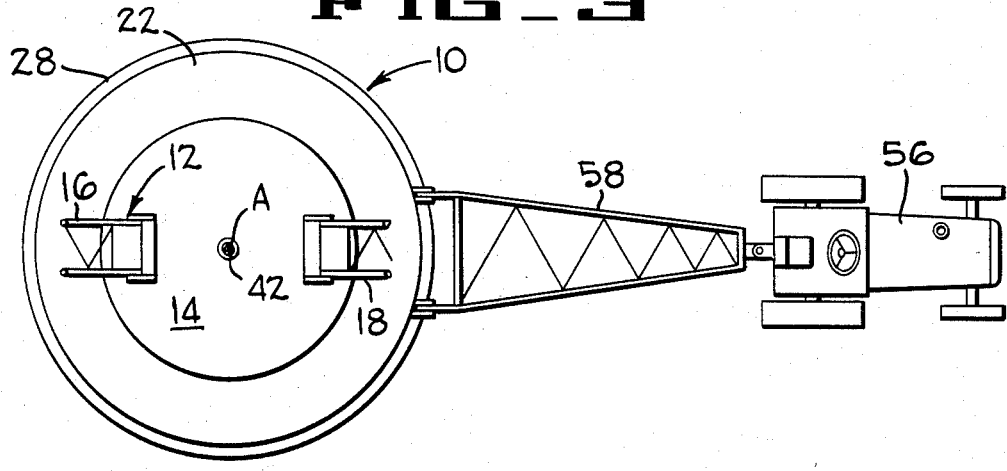
FIG_3
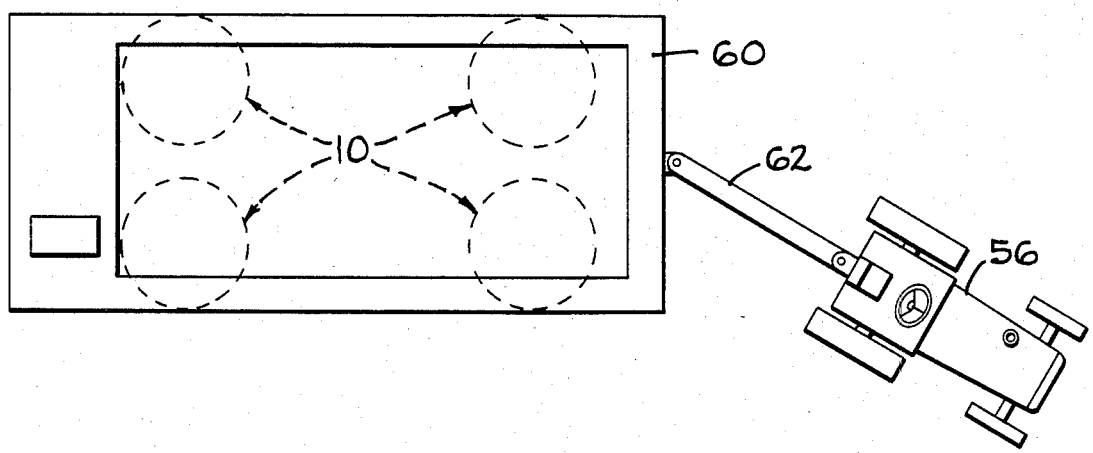
FIG_4

LOAD SUPPORTING STRUCTURE

REFERENCE TO RELATED APPLICATIONS

The present invention is pertinent to the inventions disclosed in the following copending applications assigned to the assignee of the present invention and filed on even date herewith.

Mick Application Ser. No. 478,195 entitled Steerable Carrousel Supported Walking Beam Vehicle.

Mick et al Application Ser. No. 478,193 entitled Heavy Lift Crane.

BACKGROUND OF THE INVENTION

1. Field of the Invention

The present invention relates to load supporting structures and more particularly relates to such structures having a rigid annular foot for supporting the load but aided by fluid pressure within the annulus to provide an air cushion which supports a large majority of the load to permit low frictional movement of the structure.

2. Description of the Prior Art

Load supporting structures which support different types of apparatus on a thin film of air acting on supporting surfaces while controlling the escape of air from below the load supporting structure are disclosed in the following U.S. patents:

U.S. Pat. No. 3,191,706, Peterson, Jun. 29, 1965
U.S. Pat. No. 3,592,285, Noble, Jul. 13, 1971
U.S. Pat. No. 3,598,198, Williams, Aug. 16, 1971
U.S. Pat. No. 3,780,823, Michaud et al, Dec. 25, 1973
U.S. Pat. No. 3,822,761, Vaughen, Jul. 9, 1974
U.S. Pat. No. 3,908,784, Blurton et al, Sept. 30, 1975
U.S. Pat. No. 4,273,244, Jensen et al, Jun. 13, 1981

None of the above described references disclose a rigid annular foot that encloses an air cushion therein, and which maintains the rigid annular foot on the flat supporting surface at all times for adding stability to the load supporting structure.

SUMMARY OF THE INVENTION

The apparatus of the present invention provides a stable load supporting structure which includes a rigid annular foot within which a pressure chamber is formed. The foot at all times remains supported on a substantially flat surface for assuring stability of the load, and load supporting structure, especially when supporting equipment with a high center of gravity. A fluid, preferably air, is directed into the pressure chamber at sufficient pressure to provide a shallow air cushion acting on the flat supporting surface. The pressure is controlled to support a major portion of the load, but not enough to lift the rigid annular foot off the surface, thereby allowing the load supporting structure to be easily moved over the flat surface without a loss of stability.

BRIEF DESCRIPTION OF THE DRAWINGS

FIG. 1 is a side elevation with parts shown in central vertical section illustrating the load supporting structure of the present invention, and illustrating portions of a crane superstructure mounted thereon.

FIG. 2 is a diagrammatic pneumatic diagram for controllling air pressure within the load supporting structure.

FIG. 3 is a diagrammatic plan of the apparatus of FIG. 1 taken at a smaller scale and illustrating means for moving the load supporting structure to different locations or positions.

FIG. 4 is a diagrammatic plan view of a barge supported by four of the load supporting structures, and further illustrating a towing vehicle connected thereto for sliding said supporting structures over a substantially flat surface.

DESCRIPTION OF THE PREFERRED EMBODIMENT

The load supporting structure 10 (FIGS. 1 and 3) of the present invention is preferably used as a support for the superstructure 12 of a heavy lift crane or the like capable of supporting a load of 600 tons or more. The structure 10 may also be used for supporting and moving other loads between two locations such as pallet loads of material, large structures such as barges which require several of the load supporting structures for moving the load to different positions while being built and before launching, and other heavy articles.

The preferred embodiment of the load supporting structure 10 comprises a load receiving platform 14 with the load being supported by the illustrated fragments of a boom 16 and mast 18 pivoted to the structure 10 by pins 20. An outer frusto-conical wall 22 is generated around a vertical axis A and is rigidly connected to the platform 14 and to an outer cylindrical wall 24. The lower end of the cylindrical wall 24 is rigidly connected to a rigid annular foot 26 having an upturned outer lip 28 to permit sliding movement of the load supporting structure 10 in any direction over a substantially flat surface 30.

A frusto-conical inner wall 32 and a short inner cylindrical wall 34 are rigidly secured together, and to the platform 14 and the rigid annular foot 26. A large diameter pressure chamber wall 36 and an L-shaped annular seal 38 are secured in fluid tight engagement to the inner cylindrical wall 34. A cylindrical wall 40 and a fluid supply conduit 42 are disposed between the load supporting platform 14 and the pressure chamber wall 36 for strengthening these two elements. The pressure chamber wall 36, the short cylindrical wall 34, the L-shaped seal 38 and a portion of the flat supporting surface 30 encompassed within the annular foot 26 define a shallow pressure chamber 44 which receives fluid, preferably air, from the conduit 42. The pressure chamber 44 is a shallow chamber for reducing the volume of air required, but has a large area of contact by the air cushion with the flat supporting surface 30 for minimizing the air pressure required to lift the load.

As diagrammatically illustrated in FIG. 2, an engine 50 is connected to a blower 52 which directs high pressure air into a tank 53 when a valve 54 is closed, and when valve 54 is open, through the conduit 42 into the pressure chamber 44.

FIG. 3 diagrammatically illustrates a conventional tractor 56 connected to the load supporting structure 10 by a connecting link 58. The connecting link 58 is preferably pivotally connected to the tractor 56 and rigidly connected to the structure 10 by pins or bolts.

FIG. 4 diagrammatically illustrates four of the load supporting structures 10 in supporting engagement with a barge 60 for movement to different locations by the tractor 56 which is connected thereto by a link 62.

The previously described engine 50 may be the engine of the tractor 56, with the blower 52, tank 53 and valve 54 also being supported on the tractor 56 and connected to the pressure chamber 44 by a flexible extension of the conduit 42. Alternately, the engine 50, blower 52, tank 53 and valves 54 may be mounted directly upon the load supporting structure 10.

In operation, when it is desired to move the load supporting structure 10 to a different location, the engine 50 is started to drive the blower 52, and the operator controls the valve 54 to direct air under pressure into the pressure chamber 44. The operator controls the valve 54 so that the resulting cushion of air acting on the flat supporting surface 30 is maintained at a pressure sufficient to support a substantial majority of the load acting on the load supporting structure but insufficient to lift the annular foot 26 off the surface 30. The pressure can be controlled and maintained so that the annular foot 26 supports very little weight thus making it very easy to tow the structure 10 from place to place using very little power even if the towed load is 800 tons or more.

In order to provide sufficient pneumatic lifting forces in the pressure chamber 44, it is apparent that the area of the ground within the rigid annular foot 26 and its flexible seal 38 multiplied by the air pressure will provide the lifting force necessary to support the desired amount of load acting on the load supporting structure 10. Since the rigid annular foot 26 is always in contact with the flat supporting surface 30, the load carried by the structure 10 is always adequately stabilized and minimizes the tendency of tipping the crane over even if the center of gravity is quite high as in the preferred crane supporting embodiment of the invention.

The specific internal diameter of the annular foot 26 and its flexible seal 38 will, of course, be determined by the maximum intended load to be carried, and a desirable air pressure range. In order to determine an acceptable diameter of the foot 26, it is believed that a dimensional comparison of the subject load supporting structure 10 with a conventional prior art crane designed to support an 800 ton load would be helpful.

In this regard, assignee has designed a heavy duty crane having an 800 ton load carrying capacity, which crane includes a single power unit propelled by endless tracks and includes a boom and mast supporting frame that is pivoted about a vertical axis. The frame includes wheels or rollers that are rotatably supported on a 70 foot diameter ground supported ring for permitting arcuate movement of a load suspended from the boom about the axis of the ring. It is apparent that this prior art crane cannot be moved along a linear path unless its load and counterweight are first removed and the frame supporting wheels are first raised from the ground and thereafter lowered onto the same or another 70 foot diameter ring at a new location. The above mentioned crane is disclosed in Wittman et al Applicaton Ser. No. 138,461 entitled Heavy Lift Crane, now U.S. Pat. No. 4,394,911 which issued on July 26, 1983.

If the annular foot 26 and flexible seal 38 of the load supporting structure 10 has a 70 foot internal diameter, an air pressure less than three pounds per square inch is required to lift a total load (which includes the weight of the structure 10 and the upper structure supported thereby) weighing 800 tons. If a 30 foot internal diameter is used, less than 16 pounds per square inch is required; if a 20 foot internal diameter is used less than 36 pounds per square inch is required; and if a 15 foot internal diameter is used less than 63 pounds per square inch is required for lifting a total load of 800 tons.

The preferred pressure range for use on a dirt or gravel surface 30 is preferably a low pressure range, thus requiring a large diameter foot 26. Pressure in the range of about 1-5 psi would be desirable for packed dirt or gravel surfaces. When the flat surface is concrete, wood or metal, the pressure can be much higher, preferably between about 10 psi to 36 psi.

During operation, it is apparent that the rigid annular foot 26 may be slidably pulled along a linear path by the tractor 56; may be pivoted about axis A (FIG. 3) by first turning the tractor 90° relative to the illustrated position, and then driving the tractor in an arc about the axis A. In the FIG. 4 embodiment it is apparent that the air cushions in the four load supporting structures will act substantially like wheels of a trailer.

From the foregoing description it is apparent that the load supporting structure of the present invention is stable at all times and does not require any rolling elements for allowing the structure to be moved to different locations because a cushion of air is provided to support substantially all the weight acting on the structure and because the rigid annular ring is not lifted above the supporting surface and thus provides stability to the structure. The load supporting structure is extremely simple in design, is inexpensive and may be easily moved into different positions or to different locations with a minimum of power by other vehicles of standard design.

Although the best mode contemplated for carrying out the present invention has been herein shown and described, it will be apparent that modification and variation may be made without departing from what is regarded to be the subject matter of the invention.

What is claimed is:

1. A load supporting structure for supporting and maintaining a load thereon stable when being moved on a substantially flat supporting surface comprising:

means defining a low volume substantially constant capacity pressure chamber with one wall thereof being a portion of the flat surface and having a large area, said pressure chamber including an upper wall disposed adjacent to said flat surface, and an annular outer wall rigidly secured in air tight engagement to said upper wall;

means defining a rigid annular foot encompassing the outer wall of said pressure chamber and having a planar lower surface supported on the flat supporting surface, said rigid annular foot including an upturned outer annular lip for permitting sliding movement of the load supporting structure in any direction over said substantially flat surface;

load supporting means rigidly secured to said rigid annular foot for supporting a load; and controllable means for directing air into said pressure chamber and maintaining the air at a sufficient pressure to support substantially all of the total weight of the load and the load supporting structure but insufficient to lift the rigid annular foot off said flat surface.

2. An apparatus according to claim 1 wherein said pressure chamber means includes a flexible resilient annular seal which seals said pressure chamber to said flat supporting surface to preclude a continuous flow of air below said annular foot but which will allow air leakage below said foot in the event portions of said substantially flat surface under said foot have crevices therein.

3. A load supporting structure for supporting and maintaining a load thereon stable when being moved over a substantially flat supporting surface without the aid of rolling elements, comprising:

a rigid annular foot supported on the flat surface;

means defining a flexible resilient seal for providing a substantially fluid tight seal between said foot and said flat surface;

an upper pressure chamber wall secured in fluid tight engagement with said annular foot closely adjacent to said supporting surface and cooperating with said annular foot, the flat surface, and said seal means for defining a low volume substantially constant capacity pressure chamber;

a load supporting platform;

structural means rigidly connecting said platform to said annular foot and said upper wall;

controllable means for directing a fluid into said pressure chamber at a sufficient pressure for supporting substantially the entire weight of said structure and said load but insufficient to lift said annular foot from said surface thereby maintaining stability of the loaded structure and also minimizing frictional forces between said foot and surface for easily moving the load supporting structure on the flat surface; and an upturned outer annular lip on said rigid annular foot for permitting sliding movement of the load supporting surface in any direction over the substantially flat surface.

4. A load supporting structure for supporting and maintaining a load thereon stable when being moved over a substantially flat supporting surface without the aid of rolling elements, comprising:

a rigid annular foot supported on the flat surface;

means defining a flexible resilient seal for providing a substantially fluid tight seal between said foot and said flat surface;

an upper pressure chamber wall secured in fluid tight engagement with said annular foot and cooperating with said annular foot, the flat surface, and said seal means for defining a pressure chamber;

a load supporting platform;

structural means connecting said platform to said annular foot and said upper wall;

controllable means for directing a fluid into said pressure chamber at a sufficient pressure for supporting substantially the entire weight of said structure and said load but insufficient to lift said annular foot from said surface thereby maintaining stability of the loaded structure and also minimizing frictional forces between said foot and the surface for easily moving the load supporting structure on the flat surface; and said structural means including a pair of frusto-conical walls rigidly secured to said load supporting platform, a pair of cylindrical walls each rigidly secured to one of said frusto-conical walls and to said annular foot, and a cylindrical wall rigidly connected to said platform and pressure chamber wall for providing an inexpensive but rigid load supporting structure.

5. An apparatus according to claim 4 wherein said load supporting platform is adapted to support a crane superstructure having a high center of gravity.

6. An apparatus according to claim 5 wherein said load supporting structure is easily moved and is maintained stable on said flat surface when the total weight acting on the flat surface is about 800 tons.

7. An apparatus according to claim 6 wherein the diameter of said annular foot may be in the range of about 70-15 feet when the total load is about 800 tons.

8. An apparatus according to claim 4 wherein the air pressure within said pressure chamber may be within about 3-63 psi when the diameter of the annular foot is within the range of 70-15 feet and when the total load acting on the flat surface is about 800 tons.

* * * * *